(12) United States Patent
Kromer et al.

(10) Patent No.: US 8,973,722 B2
(45) Date of Patent: Mar. 10, 2015

(54) AUTOMATIC SLACK ADJUSTER WITH CLUTCH RELEASE CAM

(71) Applicant: Bendix Spicer Foundation Brake LLC, Elyria, OH (US)

(72) Inventors: Mark Kromer, Huron, OH (US); John Louis, Elyria, OH (US); Zoltan Tormasi, Kecskemet (HU)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 0 days.

(21) Appl. No.: 14/168,196

(22) Filed: Jan. 30, 2014

(65) Prior Publication Data

US 2014/0209421 A1     Jul. 31, 2014

Related U.S. Application Data

(63) Continuation of application No. 12/273,274, filed on Nov. 18, 2008, now Pat. No. 8,672,101.

(51) Int. Cl.
| | |
|---|---|
| *F16D 65/52* | (2006.01) |
| *B60T 7/10* | (2006.01) |
| *B60T 11/06* | (2006.01) |
| *F16D 65/50* | (2006.01) |

(Continued)

(52) U.S. Cl.
CPC ............ *F16D 65/52* (2013.01); *B60T 7/108* (2013.01); *B60T 11/06* (2013.01); *F16D 65/50* (2013.01); *F16D 65/60* (2013.01); *F16D 65/58* (2013.01)
USPC .............. 188/79.55; 188/196 BA; 188/196 V

(58) Field of Classification Search
USPC ....... 188/79.51, 79.55, 79.56, 196 BA, 196 V
See application file for complete search history.

(56) References Cited

U.S. PATENT DOCUMENTS

| | | | |
|---|---|---|---|
| 3,871,495 A | 3/1975 | Devitt | |
| 3,921,765 A | 11/1975 | Swander, Jr. | |

(Continued)

FOREIGN PATENT DOCUMENTS

| | | |
|---|---|---|
| CN | 1136347 A | 11/1996 |
| CN | 2305521 Y | 1/1999 |

(Continued)

OTHER PUBLICATIONS

BPW Bergische Achsen, Automatic Slack Adjuster ECO-Master, pp. 1-16, Nov. 18, 2008.

(Continued)

*Primary Examiner* — Robert A Siconolfi
*Assistant Examiner* — Vu Q Nguyen
(74) *Attorney, Agent, or Firm* — Crowell & Moring LLP

(57) ABSTRACT

An improved self-adjusting automatic slack adjuster for reducing slack in the brake of a vehicle is provided, in which an easily accessible external operating feature permits the automatic slack adjuster's one-way clutch assembly to be readily disengaged to allow smooth release and retraction of the brake shoes of a vehicle brake without damage to the one-way teeth of the clutch assembly. When the external feature is operated in a brake release direction, the motion of the feature is translated into a motion which axially displaces an output part of the one-way clutch away from an input part of the clutch a distance sufficient to disengage the parts' one-way teeth, thereby disengaging the one-way clutch to permit brake shoe retraction without resistance from the one-way clutch.

20 Claims, 6 Drawing Sheets

(51) Int. Cl.
*F16D 65/60* (2006.01)
*F16D 65/58* (2006.01)

(56) References Cited

U.S. PATENT DOCUMENTS

| | | |
|---|---|---|
| 4,380,276 A | 4/1983 | Sweet |
| 4,440,268 A | 4/1984 | Karlsson |
| 4,583,622 A | 4/1986 | Ebbinghaus et al. |
| 4,621,714 A | 11/1986 | Skurka |
| 5,327,999 A | 7/1994 | Nelander |
| 5,350,043 A | 9/1994 | Crewson et al. |
| 5,664,647 A | 9/1997 | Edvardsson |
| 6,450,302 B1 | 9/2002 | Lyons |
| 7,198,138 B2 | 4/2007 | Chadha et al. |
| 7,757,824 B2 | 7/2010 | Echambadi et al. |
| 2006/0163014 A1 | 7/2006 | Crewson |
| 2008/0128226 A1 | 6/2008 | Iraschko |

FOREIGN PATENT DOCUMENTS

| | | |
|---|---|---|
| GB | 932155 A | 7/1963 |
| RU | 2332596 C2 | 8/2008 |
| RU | 76286 U1 | 9/2008 |

OTHER PUBLICATIONS

International Search Report dated Dec. 23, 2009 (two (2) pages).
International Preliminary Report on Patentability including Written Opinion of the International searching Authority (nine (9) pages), May 24, 2011.
Extended European Search Report dated Jul. 20, 2012 (six (6) pages).
Russian Office Action with English translation thereof Dated Jun. 27, 2013 {Thirteen (13) Pages).
Chinese Office Action with English translation thereof dated Jul. 18, 2013 {Twenty (20) pages}.

AUTOMATIC SLACK ADJUSTER WITH CLUTCH RELEASE CAM

CROSS REFERENCE TO RELATED APPLICATION

This application is a continuation of U.S. application Ser. No. 12/273,274, filed Nov. 18, 2008, the disclosure of which is expressly incorporated by reference herein.

BACKGROUND AND SUMMARY OF THE INVENTION

The present invention relates to brakes used on, for example, commercial truck or trailer axles, and in particular to automatic slack adjusters which eliminate excess motion in a brake actuator mechanism used to apply the brake.

Over the life of the brake linings of a brake, such as a pneumatic drum brake used on commercial vehicle axles, as the brake's friction linings wear the clearance between the brake linings and their respective friction surfaces (for example, the inner surface of a brake drum) increases. This increasing clearance requires an ever-increasing range of motion from the brake actuator mechanism to move the brake linings from their rest position to the point at which the linings contact the friction surface.

It has become commonplace to include an automatic slack adjuster in the mechanical path between the brake actuator and the brake linings so as to eliminate excess lining travel slack as the brake linings wear. Such adjusters typically are: (i) located on a portion of a brake camshaft which is outside of the brake (typically splined to the camshaft); and (ii) coupled to a pushrod of a brake actuator such that when the brake actuator push rod is extended or retracted, the slack adjuster rotates about the longitudinal axis of the brake camshaft. An example of such a brake and slack adjuster arrangement is shown in FIG. 1 of U.S. Pat. No. 4,380,276. Thus, by extending or retracting the brake actuator pushrod, the slack adjuster causes the brake camshaft to rotate about its longitudinal axis, which in turn rotates a brake actuation cam affixed to the end of the brake camshaft located within the drum brake. The rotation of the cam either presses the brake linings into engagement with the brake drum inner friction surface or allows the brake linings to withdraw radially inward, away from the friction surface. Because the brake camshaft is used to rotate the cam which presses the brake linings radially outward, the brake camshaft is also known as the brake cam.

Automatic slack adjusters can be designed to transmit brake actuator force to the brake camshaft in the brake application direction with no relative motion between the adjuster and the brake camshaft. When the brake actuation force is withdrawn, if there is greater than desired distance between the brake linings and the brake drum friction surface, the slack adjuster is permitted to rotate relative to the brake camshaft an angular distance sufficient to remove some or all of this undesired slack, i.e., limiting the distance the brake linings withdraw from the brake drum friction surface so that the lining-drum clearance is maintained at a desired minimum.

In many automatic slack adjusters, a one-way clutch is used to accomplish the rotary adjusting movement, with a worm shaft located in the adjuster turning a worm gear (also known as a worm wheel) coupled to the brake camshaft. In the Adjust on Release type, when the brake actuator pushrod is retracted, the worm shaft of the worm gear set rotates about is longitudinal axis, causing the worm shaft to move relative to the worm gear in a circumferential direction about the circumference of the worm gear. This relative movement of the worm shaft and gear creates corresponding relative motion between the slack adjuster body and the brake camshaft. As a result, when the brake actuator pushrod returns to its rest position the brake camshaft does not return to its original rest position. Instead, the brake camshaft only rotates through a smaller angle to a new rest position. The brake application cam thus stops in a corresponding new rest position at which the brake linings are maintained closer to the brake drum friction surface. In the Adjust on Apply type, when the brake force is applied, the worm shaft of the worm gear set rotates about is longitudinal axis, causing the worm shaft to move relative to the worm gear in a circumferential direction about the circumference of the worm gear. This relative movement of the worm shaft and gear creates corresponding relative motion between the slack adjuster body and the brake camshaft. As a result, when the brake actuator pushrod returns to its rest position the brake camshaft does not return to its original rest position. Instead, the brake camshaft only rotates through a smaller angle to a new rest position. The brake application cam thus stops in a corresponding new rest position at which the brake linings are maintained closer to the brake drum friction surface. Because the rotation of the slack adjuster relative to the brake camshaft results in reduction of brake lining clearance in the new rest position, the automatic slack adjuster compensates for brake lining and drum wear.

In many automatic slack adjusters, a one-way clutch is used to accomplish the rotary adjusting movement, with a worm shaft located in the adjuster turning a worm gear (also known as a worm wheel) coupled to the brake camshaft. In the Adjust on Release type, when the brake actuator pushrod is retracted, the worm shaft of the worm gear set rotates about is longitudinal axis, causing the worm shaft to move relative to the worm gear in a circumferential direction about the circumference of the worm gear. This relative movement of the worm shaft and gear creates corresponding relative motion between the slack adjuster body and the brake camshaft. As a result, when the brake actuator pushrod returns to its rest position the brake camshaft does not return to its original rest position. Instead, the brake camshaft only rotates through a smaller angle to a new rest position. The brake application cam thus stops in a corresponding new rest position at which the brake linings are maintained closer to the brake drum friction surface. at which the brake linings are maintained closer to the brake drum friction surface. In the Adjust on Apply type, when the brake force is applied, the worm shaft of the worm gear set rotates about its longitudinal axis, causing the worm shaft to move relative to the worm gear in a circumferential direction about the circumference of the worm gear. This relative movement of the worm shaft and gear creates corresponding relative motion between the slack adjuster body and the brake camshaft. As a result when the brake actuator pushrod returns to its rest position the brake camshaft does not return to its original rest position. Instead, the brake camshaft only rotates through a smaller angle to a new rest position. The brake application cam thus stops in a corresponding new rest position at which the brake linings are maintained closer to the brake drum friction surface. Because the rotation of the slack adjuster relative to the brake camshaft results in reduction of brake lining clearance in the new rest position, the automatic slack adjuster compensates for brake lining and drum wear.

In one type of one-way clutch arrangement, the one-way clutch is coupled to the worm shaft through a toothed clutch, which may conically shaped. A heavy coil spring or disc-spring pack is positioned at the opposite end of the worm shaft to keep the conical clutch engaged and to provide adequate torque to turn the worm shaft. The worm shaft turns the worm wheel, which is coupled to brake camshaft, in order to decrease the brake lining clearance and thus compensate for lining wear. Examples of such arrangements are shown in prior art FIGS. 1-3, corresponding respectively to FIG. 4 of U.S. Pat. No. 4,380,276 (toothed clutch teeth 63), FIG. 3 of U.S. Pat. No. 5,327,999 (toothed clutch 8), and FIG. 1 of U.S. Pat. No. 5,664,647 (toothed clutch 14).

Typically, an external extension of the worm shaft projects outside the automatic slack adjuster housing to permit manual brake lining clearance adjustment during the installation of the slack adjuster or of new brake linings (in FIG. 1, extension 57; in FIG. 2, extension 4'; in FIG. 3, extension 15). The extension usually is shaped as a square or hexagon to facilitate gripping and turning with a wrench or other tool. In order to advance the brake lining, the worm shaft must be rotated in a first direction (designated the clockwise direction for the purpose of this description). In order to retract the brake lining, the worm shaft must be rotated in the opposite, or counter-clockwise, direction.

The slipping of the toothed clutch in response to the application of a large torque to the external extension results in undesired blunting of the teeth in the clutch. As the clutch teeth wear, the torque capacity of the automatic slack adjuster decreases, progressively reducing the useful service life of the automatic slack adjuster. Attempts have been made to reduce this undesired deterioration of the clutch teeth, for example, by altering the angle of the clutch teeth or rounding the tips of the teeth as shown in prior art FIGS. 3A-3B, corresponding to FIGS. 3-4 of U.S. Pat. No. 5,664,647. However, these slight teeth geometry changes have not been fully successful in addressing the wear concerns.

The slipping of the toothed clutch in response to the application of a large torque to the external extension results in undesired blunting of the teeth in the clutch. As the clutch teeth wear, the torque capacity of the automatic slack adjuster decreases, progressively reducing the useful service life of the automatic slack adjuster. Attempts have been made to reduce this undesired deterioration of the clutch teeth, for example, by altering the angle of the clutch teeth or rounding the tips of the teeth as shown in prior art FIGS. 4A-4B, corresponding to FIGS. 3-4 of U.S. Pat. No. 5,664,647. However, these slight teeth geometry changes have not been fully successful in addressing the wear concerns.

In view of the foregoing, it is an objective of the present invention to provide an improved automatic slack adjuster with superior manual adjustment provisions. In addressing these and other objectives, the present invention provides a solution to the problems of the prior art by providing for an automatic disengagement of the one-way clutch teeth and free release of the clutch to permit smooth withdrawal of brake shoes as an external adaptor part is manually operated.

In one embodiment of the present invention, the adaptor part and an adjacent end of the automatic slack adjuster's worm shaft are provided with corresponding axially-oriented lugs which permit the adaptor part to drive rotation of the worm shaft in the clockwise and counter-clockwise directions. Between the lugs, ramps are provided which, when the lugs are displaced circumferentially relative to one another, cause the adaptor part to push the worm shaft to move axially away from the adapter part. This axial displacement of the worm shaft axially lifts the output part of the one-way clutch out of engagement with the input part, disengaging the one-way clutch's one-way teeth and thereby permitting the worm shaft to smoothly rotate within the automatic slack adjuster housing without damaging the engagement teeth within the one-way clutch.

In an alternative embodiment of the present invention, a similar camming action may be obtained by the interaction of camming surfaces of the adaptor part and a rod which extends through a bore in the worm shaft and is fixed to the output part of the one-way clutch. In this embodiment, when the adaptor part is operated in the brake shoe retraction direction, the axial displacement of the cam rod pushes the one-way clutch output part out of engagement with the input part, freeing the worm shaft to be smoothly turned.

Other objects, advantages and novel features of the present invention will become apparent from the following detailed description of the invention when considered in conjunction with the accompanying drawings.

DETAILED DESCRIPTION OF THE DRAWINGS

Figure 1:
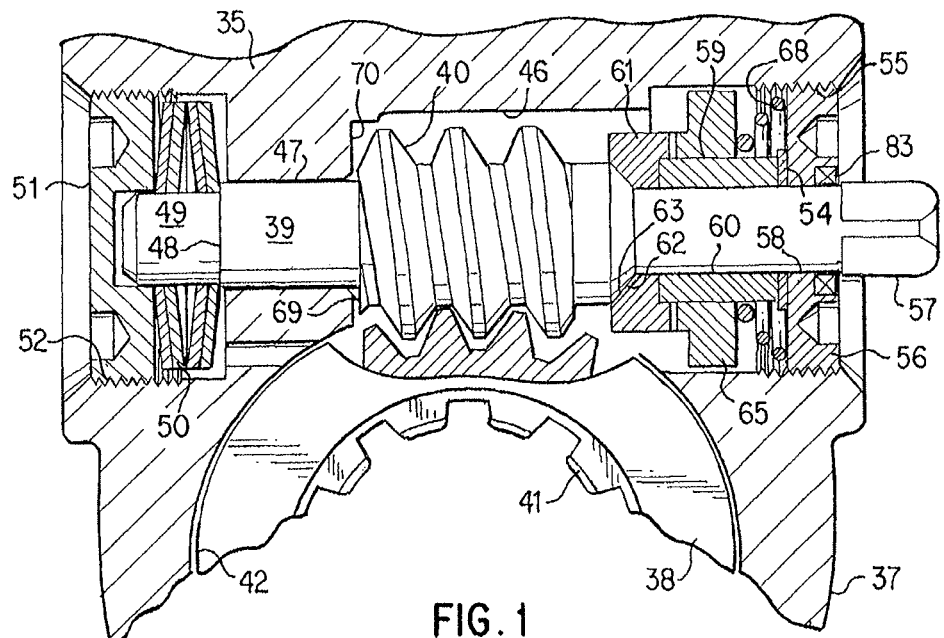
FIGS. 1, 2 and 3A-3C are views of prior art slack adjuster worm gear and one-way adjustment clutch arrangements.
Figure 2:
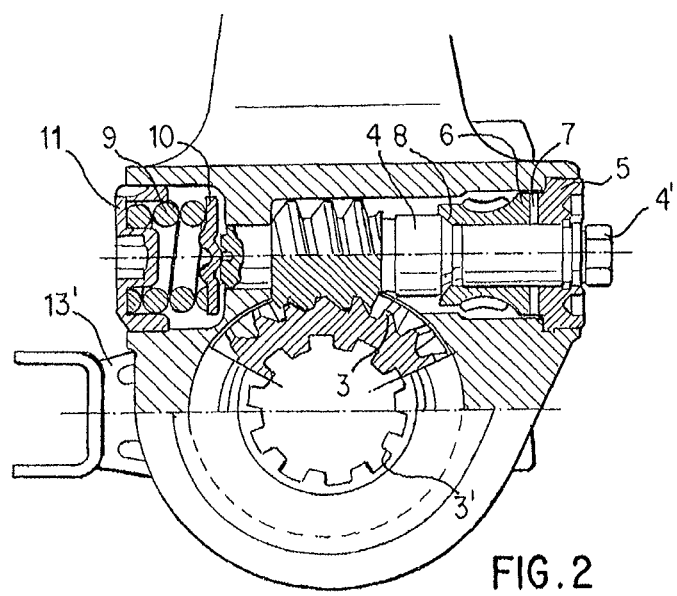
Figure 3B:
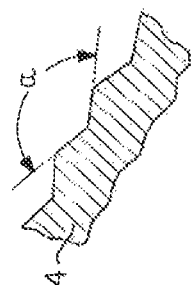
Figure 3C:
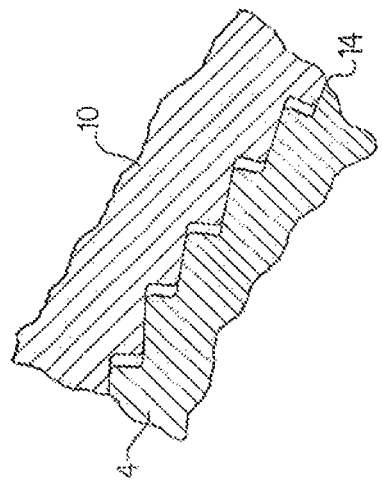
Figure 3A:
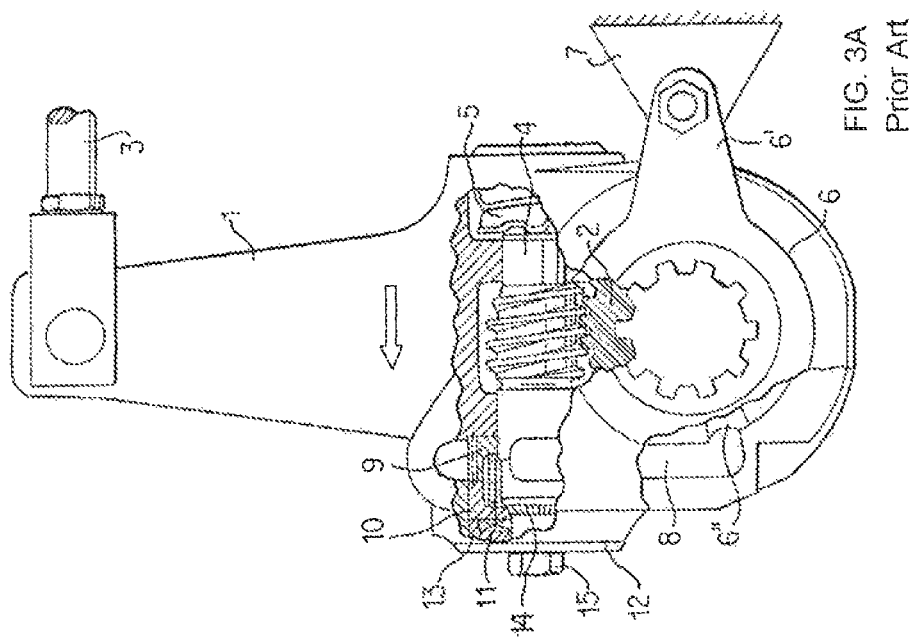
Figure 4A:
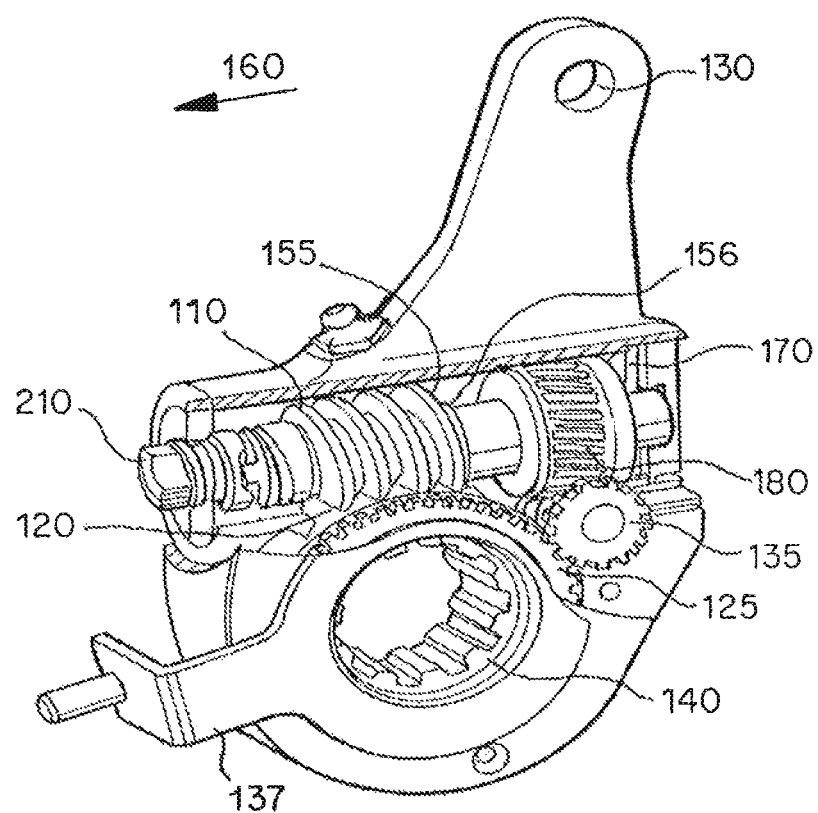
FIG. 4A is an oblique partial cut-away view of an automatic slack adjuster in accordance with an embodiment of the present invention.
Figure 4B:
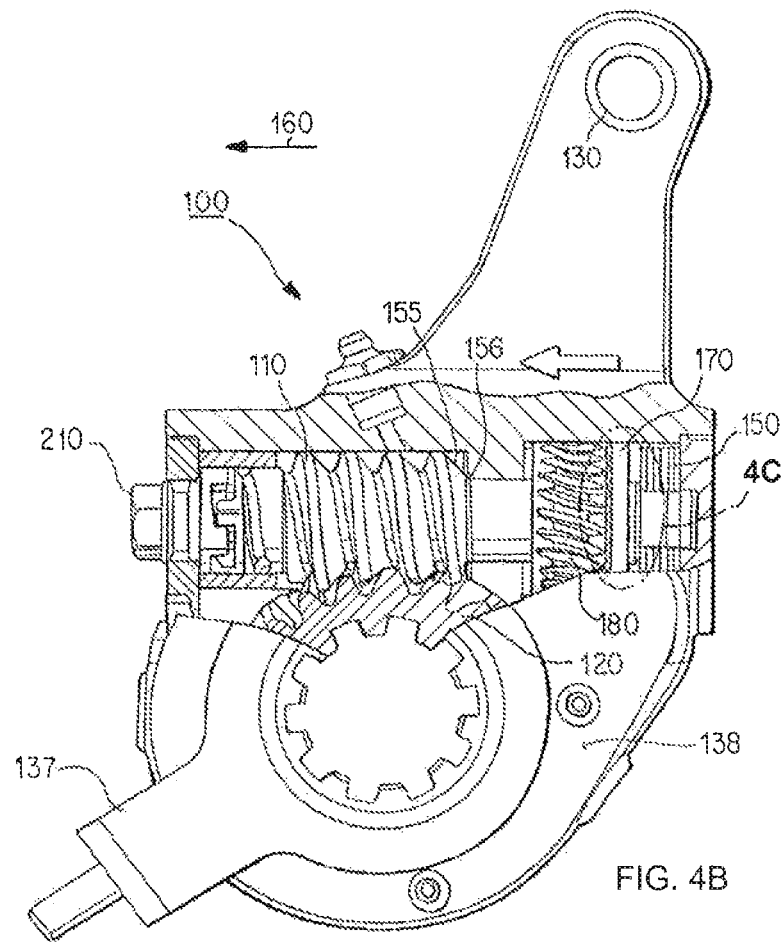
FIG. 4B is an elevation partial cut-away view of the FIG. 4A automatic slack adjuster.
Figure 4C:
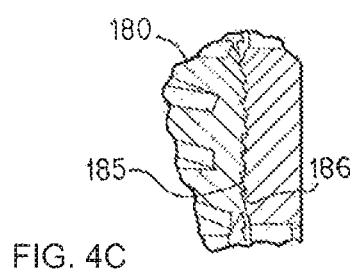
FIG. 4C is an enlarged view of a detail of the one-way clutch of FIGS. 4A and 4B.
Figure 5A:
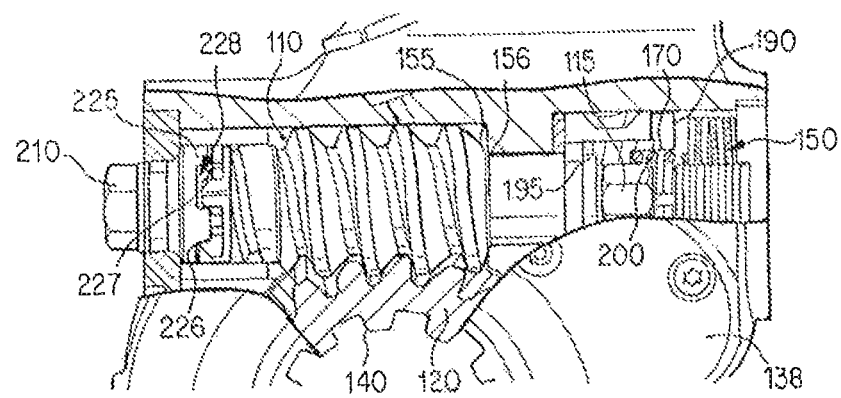
FIG. 5A is a enlarged view of the components shown in section A of the partial cross-section in FIG. 4A.
Figure 5B:
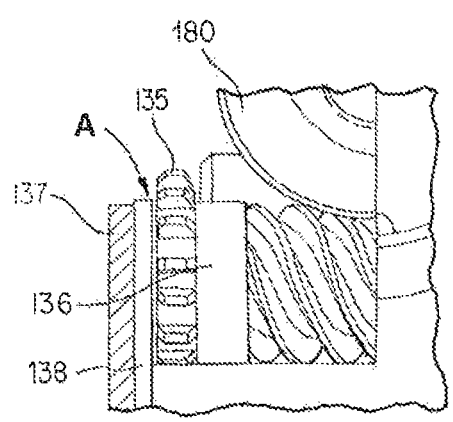
FIG. 5B is a transverse cut-away view of the FIG. 5A embodiment viewed from the one-way clutch end of the automatic slack adjuster.

FIGS. 4A-4C are partial cut-away views of a clearance-sensing automatic slack adjuster of the self-setting type 100, and FIGS. 5A-5B provide enlarged views of the cut-away areas of FIGS. 4A-4C. The automatic slack adjuster 100 has a main gear set comprising a worm shaft 110 meshing with a worm gear 120, a brake actuator pushrod receiving hole 130 for coupling the automatic slack adjuster 100 to a brake actuator pushrod (not illustrated), and a splined coupling 140 either integrally formed with or otherwise coupled to the worm gear 120 to receive an end of a brake camshaft (not illustrated). The worm shaft 110 is provided with a heavy coil spring or a disc spring pack 150 preloaded to bias the worm shaft load face 155 away from its corresponding housing mating face 156 by a designed gap.

Concentrically located adjacent to worm gear 120 is a reference wheel 125, which is non-rotationally fixed to stationary reference arm 137, the reference arm being secured to a fixed point, such as the axle of the vehicle. The reference wheel 125 meshes with adjustment wheel 135, which through a worm shaft extension 136 drives the control worm wheel 180, coupled via one-way clutch 170 to the worm shaft 110. The control worm wheel 180 is formed with saw-tooth teeth 185 on an end face. The control worm wheel teeth 185, which function as the input part to the one-way clutch 170, cooperates with corresponding saw-tooth teeth 186 on the output side of the one-way clutch. The output part of the one-way clutch is a ratchet wheel 190, keyed to the worm shaft 110 by a polygon section 115 (or another alternate feature, such as a roll pin or other component sufficient to preclude rotation of the output side of the one-way clutch relative to the worm shaft 110). The output part of the one-way clutch (ratchet wheel 190) is held axially against a step 195 on the worm shaft 110 by a light spring 200.

In the preferred embodiment, which is of the "Adjust on Apply" type, prior to application of a braking force, as shown in FIG. 5B the wheel of adjuster screw 135 rests in the slack adjuster housing a predetermined distance a from the outer cover 138. This distance corresponds to the desired brake lining clearance. As the brake actuation pushrod rotates the automatic slack adjuster, the adjuster screw 135 begins to climb along the circumference of fixed reference wheel 125, driven by the engagement of its worm threads 136 with the control worm wheel 180. At the same time, the adjuster screw 135 begins to move axially outward toward the outer cover 138. An alternate variant to the preferred embodiment is of the "Adjust on Release type" in which prior to application of a braking force, as shown in FIG. 5B the wheel of adjuster screw 135 rests against the outer cover, a predetermined distance a from the housing. This distance corresponds to the desired brake lining clearance. As the brake actuation pushrod rotates the automatic slack adjuster, the adjuster screw 135 begins to climb along the circumference of fixed reference wheel 125, driven by the engagement of its worm threads 136 with the control worm wheel 180. At the same time, the adjuster screw 135 begins to move axially inward toward the housing.

Prior to application of a braking force, as shown in FIG. 5B the adjuster wheel 135 rests in the slack adjuster housing a predetermined distance a from the outer cover 138. This distance corresponds to the desired brake lining clearance. As the brake actuation pushrod rotates the automatic slack adjuster, the adjuster screw 135 begins to climb along the circumference of fixed reference wheel 125, driven by the engagement of its worm threads 136 with the control worm wheel 180. At the same time, the adjuster screw 135 begins to move axially outward toward the outer cover 138. If there is no excessive wear in the brake, the linings will touch the brake drum when the adjuster screw 135 closes the predetermined distance a, and thus the adjuster wheel 135 will not rotate control worm wheel 180.

Prior to application of a braking force, as shown in FIG. 5B the adjuster wheel 135 rests in the slack adjuster housing a predetermined distance a from the outer cover 137. This distance corresponds to the desired brake lining clearance. As the brake actuation pushrod rotates the automatic slack adjuster, the adjuster screw 135 begins to climb along the circumference of fixed reference wheel 125, driven by the engagement of its worm threads 136 with the control worm wheel 180. At the same time, the adjuster screw 135 begins to move axially outward toward the outer cover 137. If there is no excessive wear in the brake, the linings will touch the brake drum when the adjuster screw 135 closes the predetermined distance a, and thus the adjuster wheel 135 will not rotate control worm wheel 180.

In both the above embodiments, If there is no excessive wear in the brake, the linings will touch the brake drum when the adjuster screw 135 closes the predetermined distance a, and thus the adjuster wheel 135 will not rotate control worm wheel 180.

On the other hand, if there is excessive slack present due to brake lining wear, the brake actuator pushrod will cause the automatic slack adjuster to continue to rotate in brake application direction 160, and adjuster wheel 135 will continue to climb reference wheel 125 until the brake linings come into full contact with the brake drum. As noted above, when full contact of the brake linings with the brake drum is reached, the worm shaft 110 is displaced axially until its load face 155 rests again the mating face 156 of the housing. This same axial motion also axially separates the toothed faces of the one-way clutch 170, disengaging the control worm wheel 180) from the worm shaft 110. Accordingly, any further motion of the adjuster wheel 135 about reference wheel 125 will cause the adjuster wheel worm shaft threads 136 to rotate control wheel 180 about the worm shaft 110, but will not result in adjustment of the worm shaft 110.

On the other hand, if there is excessive slack present due to brake lining wear, the brake actuator pushrod will cause the automatic slack adjuster to continue to rotate in brake application direction 160, and adjuster wheel 135 will continue to climb reference wheel 125 until the brake linings come into full contact with the brake drum. As noted above, when full contact of the brake linings with the brake drum is reached, the worm shaft 110 is displaced axially until its load face 155 rests again the mating face 156 of the housing. This same axial motion also axially separates the toothed faces of the one-way clutch 170, disengaging the control worm wheel 180) from the worm shaft 110. Accordingly, any further motion of the adjuster wheel 135 about reference wheel 2 will cause the adjuster wheel worm shaft threads 136 to rotate control wheel 180 about the worm shaft 110, but will not result in adjustment of the worm shaft 110.

During brake application, the rotational input to the one-way clutch 170 is in the free-wheel direction, and thus as the input part teeth 185 tend to slide lout of engagement with the teeth 186 of the ratchet wheel 190, the output part effectively pushes the ratchet wheel 190 against the light spring 200. If the force pushing the ratchet wheel is sufficiently high, the one-way clutch skips forward by a tooth. Then, during the brake return stroke, as the input part rotates in the brake release direction, the teeth 185 re-engage teeth 186. The rotation of the output part 190 thus also rotates the input part 180 in the brake release direction. Because the output part 190 is held in a rotationally-fixed relationship to the worm shaft 110 by polygon-shaped region 115, the worm shaft 110 is rotationally displaced relative to the worm wheel 120, such that the worm wheel 120 does not return to its original rest position, but instead comes to rest in a position corresponding to the brake cam shaft and the brake shoe being closer to the brake drum, i.e., in a position which reduces excess clearance.

During brake application, the rotational input to the one-way clutch 170 is in the free-wheel direction, and thus as the input part teeth 185 tend to slide lout of engagement with the teeth 186 of the ratchet wheel 190, the output part effectively pushes the ratchet wheel 190 against the light spring 200. If the force pushing the ratchet wheel is sufficiently high, the one-way clutch skips forward by a tooth. Then, during the brake return stroke, as the input part rotates in the brake release direction, the teeth 185 re-engage teeth 186. The rotation of the output part 190 thus also rotates the input part 190 in the brake release direction. Because the output part 190 is held in a rotationally-fixed relationship to the worm shaft 110 by polygon-shaped region 115, the worm shaft 110 is rotationally displaced relative to the worm wheel 120, such that the worm wheel 120 does not return to its original rest position, but instead comes to rest in a position corresponding to the brake cam shaft and the brake shoe being closer to the brake drum, i.e., in a position which reduces excess clearance.

As described above, when the brake application force reaches a predetermined value, worm shaft 110 initially moves backward until it reaches housing mating face 156. In doing so, the worm shaft pushes the output part 190 of the one-way clutch out of engagement with the teeth 185 of the input part, with no further adjustment. In this way a clearance sensing function is realized, by disengagement of the one-way clutch.

With automatic slack adjusters, manual shoe adjustment, either advancing or back-off, is typically accomplished by manually turning the worm shaft 110 clockwise or counter-clockwise, respectively.

In this embodiment of the invention, an adaptor part 210 projects out of the automatic slack adjuster housing and is provided with a hexagonal end for applying a wrench or similar tool. On the inside of the housing, the adaptor part and worm shaft are rotationally coupled by corresponding driving lugs 225, 226. The openings 227 between the lugs are wider than the lugs, so that in each direction of rotation one set of lug side faces are in contact with one another, and there is a gap between the opposite lug side faces. The adaptor part 210 also is provided with a feature which has a slit to hold a leaf spring. The leaf spring is positioned such it exerts a force on the worm shaft lugs 226 to bias the lugs 226 into contact with the corresponding side faces of adaptor part lugs 225 which are engaged when turning in the brake shoe advance direction (in this embodiment, clockwise). It may be noted that the function of the leaf spring may alternatively be accomplished by the use of a torsion spring.

In the adaptor part the opening between adjacent lugs is constructed so that when brake shoes are to be manually advanced, one set of drive faces of the adjuster part lugs 225 are in contact with the corresponding faces of the lugs 226 of the worm shaft. In this condition there is no axial contact between the adaptor and worm shaft.

When the adaptor part 210 is manually rotated in the brake release direction (in this embodiment, counter-clockwise), the worm shaft lugs 226 encounter a ramp construction 228 provided in the webbing between the adaptor lugs 225. The ramps 228 are arranged such that as soon as the adaptor part 210 starts to turn counter-clockwise, the ramps contact the end faces of the worm shaft lugs 226. As the worm shaft lugs 226 move toward contact with the corresponding side faces of the adaptor part lugs 225, the ramps 228 affect a cam action which pushes the worm shaft 110 axially away from the adaptor part 210. This axial motion of the worm shaft 110 results in a corresponding axial motion of the one-way clutch output part 190. Before the worm shaft 110 contacts the mating face 156 in the housing, the clutch output part 150 is pushed by worm shaft step 195 axially a distance sufficient to disengage it from the input part 180. Thus, by rotating adaptor part 210 in the counter-clockwise direction, the ramps 228 cause the worm shaft to automatically take the teeth 186 of output part 190 out of engagement with the teeth 185 of the input part so that the worm shaft 110 is may turn freely, thereby permitting brake back-off to be accomplished in smooth manner without any forced slippage of clutch teeth.

Figure 6:
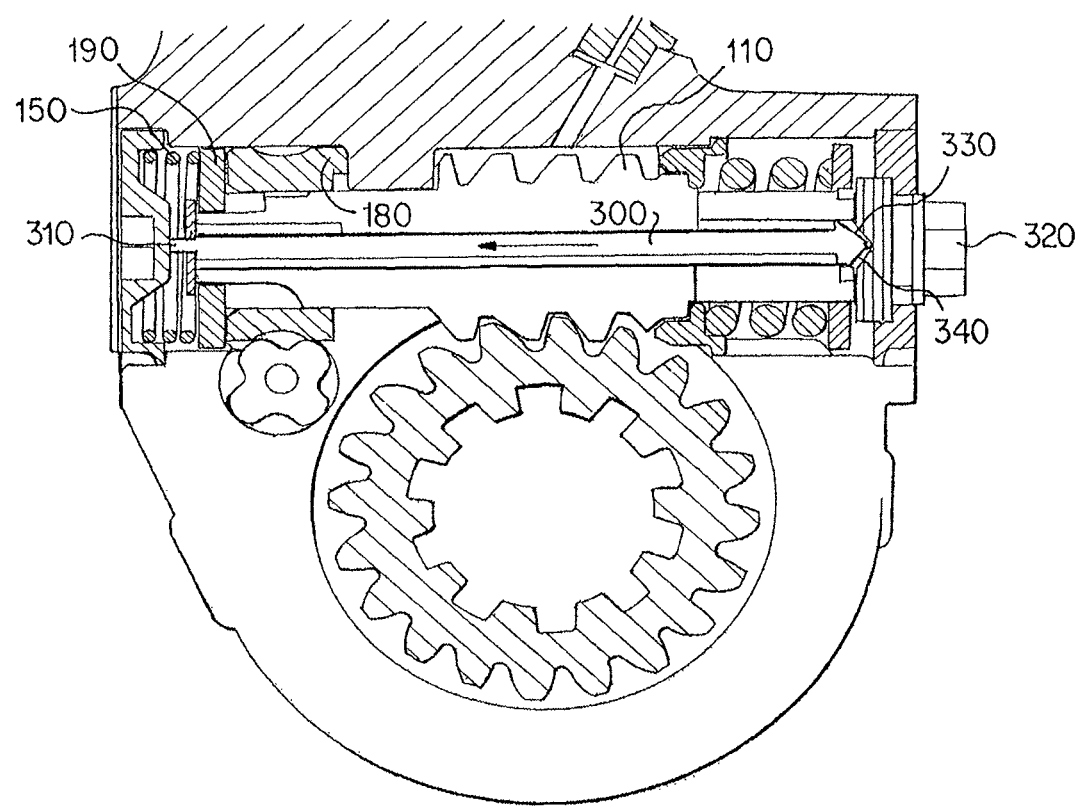
FIG. 6 is cross-section view of an automatic slack adjuster in accordance with an alternative embodiment of the present invention.

An alternative embodiment of the present invention is illustrated in FIG. 6. In this embodiment, an output part disengaging actuator, here in the form of a slender coaxial rod 300 slidingly positioned within a hole running through the length of the worm shaft 100, is used to axially displace the output part of the one-way clutch to disengage the output part from the input part. The inner end 310 the rod may rest against an actuating surface of the output part 190 of the one-way clutch, or as shown in FIG. 6, may be coupled to the output part. As with the FIG. 4A embodiment, the output part 190 is biased into engagement with control worm wheel 180 by a light spring 150. One of ordinary skill will recognize that the output part disengaging actuator need not be acted directly by the adaptor part, or need not act directly on the output part, but may alternatively act indirectly through intermediate elements to transfer motion from the adaptor part to the output part of the one-way clutch.

The manual adjustment adaptor part 320 in this embodiment is constructed with a cam surface 330 on inside surface. The cam surface 330 engages with a mating cam 340 on the adaptor part end of the coaxial rod 300. When the adaptor is turned in the brake back-off direction (in this embodiment, counter-clockwise), the interaction of the cam 340 with cam surface 330 pushes the coaxial rod 300 toward the one-way clutch, moving the output part 190 axially out of engagement with the input part. The adaptor part 320, which is also arranged to engage and rotate the worm shaft 110, is thereby free to turn the worm shaft in a smooth manner without any forced slippage of clutch teeth.

The foregoing disclosure has been set forth merely to illustrate the invention and is not intended to be limiting. For example, in the FIG. 5A embodiment, it does not matter whether the ramp is provided between the adaptor part lugs or between the worm shaft lugs, as long as the required camming action is provided to lift the one-way clutch output part axially out of engagement with the control worm wheel's one-way teeth. Because such modifications of the disclosed embodiments incorporating the spirit and substance of the invention may occur to persons skilled in the art, the invention should be construed to include everything within the scope of the appended claims and equivalents thereof.

What is claimed is:

1. An automatic slack adjuster for a vehicle brake, comprising:
   a housing configured to be coupled to a brake actuator for applying a brake actuating force to the vehicle brake;
   a worm gear set carried by the housing, the worm gear set including a worm gear and a worm shaft, wherein
      the worm gear is arranged to engage a brake cam shaft of the vehicle brake, and
      the worm shaft is arranged to transfer the brake actuating force from the housing to the worm gear;
   an axially-separable assembly having an input part and an output part, the output part being coupled to the worm shaft and the input part being coupled to a wear adjustment control mechanism such that when the input part and the output part are engaged, the worm shaft is capable of being rotated by the wear adjustment control mechanism; and
   an adaptor part carried by the housing and having an externally-accessible operating feature, wherein when the adaptor part is operated in a brake release direction, the output part is disengaged from the input part,
   wherein when the adaptor part is operated in the brake release direction, the adaptor part rotates and axially displaces the worm shaft a distance sufficient to disengage the output part from the input part by removing at least a portion of a load pressing the output part and the input part toward one another and maintain the input part and the output part disengaged from one another during operation of the adaptor part in the brake release direction.

2. The automatic slack adjuster of claim 1, wherein
   the adaptor part and the worm shaft each have at least one mutually complementary projection and recess,
   when the adaptor part is operated in the brake release direction, the at least one adaptor part projection and recess cooperate with the at least one worm shaft projection and recess to rotate the worm shaft, and
   at least one of the at least one adaptor part recess and the at least one worm shaft recess includes a cam surface, the cam surface being arranged to interact with a complementary projection to axially displace the worm shaft before the at least one projection of the adaptor part contacts the at least one projection of the worm shaft to cause the worm shaft to rotate.

3. The automatic slack adjuster of claim 2, wherein
the adaptor part causes the worm shaft to rotate when a lateral surface of the at least one adaptor part projection contacts a lateral surface of the at least one worm shaft projection.

4. The automatic slack adjuster of claim 1, wherein
the adaptor part and the worm shaft each have at least one mutually complementary projection and recess,
when the adaptor part is operated in the brake release direction, the at least one adaptor part projection and recess cooperate with the at least one worm shaft projection and recess to rotate the worm shaft, and
at least one of the at least one adaptor part recess and the at least one worm shaft recess includes a cam surface, the cam surface being arranged to interact with a complementary projection to axially displace the worm shaft until the adaptor causes the worm shaft to rotate.

5. The automatic slack adjuster of claim 1, further comprising:
an output part disengaging actuator, wherein
when the adaptor part is operated in the brake release direction, the adaptor part rotates and axially displaces the output part disengaging actuator a distance sufficient to disengage the output part from the input part.

6. The automatic slack adjuster of claim 5, wherein
the output part disengaging actuator is an actuating rod slidingly located within a through bore of the worm shaft,
a first end of the actuating rod cooperates with a cam surface of the adaptor part and a second end of the actuating rod cooperates with an actuating surface of the output part, and
when the adaptor part is operated in the brake release direction, the actuating rod is axially displaced a distance sufficient to disengage the output part from the input part.

7. A vehicle brake, comprising:
a brake actuator having a brake actuation pushrod;
the brake arranged to be located on an axle of a vehicle and having a brake camshaft, the brake camshaft having a first end located at the brake and a second end distal from the brake, wherein rotation of the brake camshaft about a longitudinal axis actuates the brake; and
an automatic slack adjuster coupled between the brake actuator pushrod and the brake camshaft to transfer a brake actuating force from the pushrod to rotate the brake camshaft, the automatic slack adjuster comprising:
a housing, the housing coupled to the brake actuator for the vehicle brake;
a worm gear set carried by the housing, the worm gear set including a worm gear and a worm shaft, wherein the worm gear is arranged to engage the brake cam shaft, and
the worm shaft is arranged to transfer the brake actuating force applied to the housing from the housing to the worm gear;
an axially-separable assembly having an input part and an output part, the output part being coupled to the worm shaft and the input part being coupled to a wear adjustment control mechanism such that when the input part and the output part are engaged, the worm shaft is capable of being rotated by the wear adjustment control mechanism; and
an adaptor part carried by the housing and having an externally-accessible operating feature, wherein when the adaptor part is operated in a brake release direction, the output part is disengaged from the input part,
wherein when the adaptor part is operated in the brake release direction, the adaptor part rotates and axially displaces the worm shaft a distance sufficient to disengage the output part from the input part by removing at least a portion of a load pressing the output part and the input part toward one another and maintain the input part and the output part disengaged from one another during operation of the adaptor part in the brake release direction.

8. The vehicle brake of claim 7, wherein
the adaptor part and the worm shaft each have at least one mutually complementary projection and recess,
when the adaptor part is operated in the brake release direction, the at least one adaptor part projection and recess cooperate with the at least one worm shaft projection and recess to rotate the worm shaft, and
at least one of the at least one adaptor part recess and the at least one worm shaft recess includes a cam surface, the cam surface being arranged to interact with a complementary projection to axially displace the worm shaft before the at least one projection of the adaptor part contacts the at least one projection of the worm shaft to cause the worm shaft to rotate.

9. The vehicle brake of claim 8, wherein
the adaptor part causes the worm shaft to rotate when a lateral surface of the at least one adaptor part projection contacts a lateral surface of the at least one worm shaft projection.

10. The vehicle brake of claim 7, further comprising:
an output part disengaging actuator, wherein
when the adaptor part is operated in the brake release direction, the adaptor part rotates and axially displaces the output part disengaging actuator a distance sufficient to disengage the output part from the input part.

11. The vehicle brake of claim 10, wherein
the output part disengaging actuator is an actuating rod slidingly located within a through bore of the worm shaft,
a first end of the actuating rod cooperates with a cam surface of the adaptor part and a second end of the actuating rod cooperates with an actuating surface of the output part, and
when the adaptor part is operated in the brake release direction, the actuating rod is axially displaced a distance sufficient to disengage the output part from the input part.

12. A vehicle, comprising:
at least one axle having a brake, the brake including
a brake actuator having a brake actuation pushrod;
the brake arranged to be located on the at least one axle of the vehicle and having a brake camshaft, the brake camshaft having a first end located at the brake and a second end distal from the brake, wherein rotation of the brake camshaft about a longitudinal axis actuates the brake; and
an automatic slack adjuster coupled between the brake actuation pushrod and the brake camshaft to transfer a brake actuating force from the pushrod to rotate the brake camshaft, the automatic slack adjuster comprising:

a housing, the housing coupled to the brake actuator for the vehicle brake;

a worm gear set carried by the housing, the worm gear set including a worm gear and a worm shaft, wherein the worm gear is arranged to engage the brake cam shaft, and the worm shaft is arranged to transfer the brake actuating force applied to the housing from the housing to the worm gear;

an axially-separable assembly having an input part and an output part, the output part being coupled to the worm shaft and the input part being coupled to a wear adjustment control mechanism such that when the input part and the output part are engaged, the worm shaft is capable of being rotated by the wear adjustment control mechanism; and an adaptor part carried by the housing and having an externally-accessible operating feature, wherein when the adaptor part is operated in a brake release direction, the output part is disengaged from the input part;

wherein when the adaptor part is operated in the brake release direction, the adaptor part rotates and axially displaces the worm shaft a distance sufficient to disengage the output part from the input part by removing at least a portion of a load pressing the output part and the input part toward one another and maintain the input part and the output part disengaged from one another during operation of the adaptor part in the brake release direction.

13. The vehicle of claim 12, wherein the adaptor part and the worm shaft each have at least one mutually complementary projection and recess, when the adaptor part is operated in the brake release direction, the at least one adaptor part projection and recess cooperate with the at least one worm shaft projection and recess to rotate the worm shaft, and at least one of the at least one adaptor part recess and the at least one worm shaft recess includes a cam surface, the cam surface being arranged to interact with a complementary projection to axially displace the worm shaft before the at least one projection of the adaptor part contacts the at least one projection of the worm shaft to cause the worm shaft to rotate.

14. The vehicle of claim 13, wherein the adaptor part causes the worm shaft to rotate when a lateral surface of the at least one adaptor part projection contacts a lateral surface of the at least one worm shaft projection.

15. The vehicle of claim 13, further comprising:

an output part disengaging actuator, wherein when the adaptor part is operated in the brake release direction, the adaptor part rotates and axially displaces the output part disengaging actuator a distance sufficient to disengage the output part from the input part.

16. The vehicle of claim 15, wherein the output part disengaging actuator is an actuating rod slidingly located within a through bore of the worm shaft, a first end of the actuating rod cooperates with a cam surface of the adaptor part and a second end of the actuating rod cooperates with an actuating surface of the output part, and when the adaptor part is operated in the brake release direction, the actuating rod is axially displaced a distance sufficient to disengage the output part from the input part.

17. An automatic slack adjuster for a vehicle brake, comprising:

a housing, the housing configured to be coupled to a brake actuator for applying a brake actuating force to the vehicle brake;

a worm gear set carried by the housing, the worm gear set including a worm gear and a worm shaft, wherein the worm gear is arranged in the housing to rotate about an axis perpendicular to a plane in which the housing is rotated when the brake actuating force is applied to the vehicle brake, and configured to be operably connected to a brake cam shaft of the vehicle brake so as to rotate the brake cam shaft when the brake actuating force is applied to the housing, the worm shaft is arranged in the housing in the plane in which the housing is rotated when the brake actuating force is applied to the vehicle brake and engages an outer circumference of the worm gear, and configured to contact the housing to transfer the brake actuating force from the housing to the worm gear;

an axially-separable assembly having an input part and an output part, the output part being coupled to the worm shaft and the input part being coupled to a wear adjustment control mechanism such that when the input part and the output part are engaged, the worm shaft is capable of being rotated by the wear adjustment control mechanism; and an adaptor part carried by the housing and having an externally-accessible operating feature, wherein when the adaptor part is operated in a brake release direction, an axial projection of one of the adaptor part and the worm shaft moves along a ramp-shaped cam surface on the other of the adaptor part and the worm shaft so as to displace the worm shaft in an axial direction and thereby cause a surface of the worm shaft to displace one of the output part and the input part to disengage the axially-separable assembly before the adaptor part begins to rotate the worm shaft.

18. A method of releasing a vehicle brake having an automatic slack adjuster, comprising:

providing the automatic slack adjuster between a brake actuator for applying a brake actuating force and a brake cam shaft of the vehicle brake, the automatic slack adjuster including a housing configured to be coupled to the brake actuator to receive the brake actuating force;

a worm gear set carried by the housing, the worm gear set including a worm gear and a worm shaft, wherein the worm gear is arranged to engage the brake cam shaft of the vehicle brake, and the worm shaft is arranged to transfer the brake actuating force from the housing to the worm gear;

an axially-separable assembly having an input part and an output part, the output part being coupled to the worm shaft and the input part being coupled to a wear adjustment control mechanism such that when the input part and the output part are engaged, the worm shaft is capable of being rotated by the wear adjustment control mechanism; and an adaptor part carried by the housing and having an externally-accessible operating feature, wherein when the adaptor part is operated in a brake release direction, the output part is disengaged from the input part;

operating the adaptor part in a brake release direction, wherein an initial motion of the adaptor part causes an axial displacement of one of the output part and the input part of the axially-separable assembly a distance sufficient to disengage the axially-separable assembly by removing at least a portion of a load pressing the output part and the input part toward one another prior to further motion of the adaptor part moving the worm shaft in the brake release direction, and as the adaptor part is further operated in the brake release direction the input part and the output part remain disengaged from one another.

19. The method of releasing a vehicle brake of claim 18, wherein when the adaptor part is operated in the brake release direction, the adaptor part rotates and axially displaces the worm shaft a distance sufficient to disengage the output part from the input part.

20. The method of releasing a vehicle brake of claim 18, further comprising:

an output part disengaging actuator, wherein when the adaptor part is operated in the brake release direction, the adaptor part rotates and axially displaces the output part disengaging actuator a distance sufficient to disengage the output part from the input part.

* * * * *